United States Patent [19]
Rogols et al.

[11] Patent Number: 5,897,898
[45] Date of Patent: Apr. 27, 1999

[54] PROCESS FOR PREPARING STARCH HYDROLYZATE COATED POTATO PRODUCTS

[75] Inventors: Saul Rogols, Golden; John Harold Woerman, Highlands Ranch, both of Colo.

[73] Assignee: Penwest Foods Co., Englewood, Colo.

[21] Appl. No.: 08/792,543

[22] Filed: Jan. 31, 1997

[51] Int. Cl.$^6$ .................................................. A23L 1/217
[52] U.S. Cl. ......................... 426/102; 426/302; 426/438; 426/637
[58] Field of Search .................................. 426/102, 302, 426/438, 637, 661

[56] References Cited

U.S. PATENT DOCUMENTS

| | | |
|---|---|---|
| Re. 27,531 | 12/1972 | Murray et al. . |
| 3,424,591 | 1/1969 | Gold .......................................... 426/441 |
| 3,597,227 | 8/1971 | Murray et al. . |
| 3,751,268 | 8/1973 | Van Patten et al. . |
| 4,272,553 | 6/1981 | Bengtsson et al. ....................... 426/241 |
| 4,317,842 | 3/1982 | El-Hag ...................................... 426/302 |
| 4,418,090 | 11/1983 | Bohrmann et al. ....................... 426/578 |
| 4,447,459 | 5/1984 | Balboni et al. ........................... 426/441 |
| 4,504,509 | 3/1985 | Bell et al. ................................. 426/548 |
| 4,529,607 | 7/1985 | Lenchin et al. ........................... 426/94 |
| 4,542,030 | 9/1985 | Haury et al. ............................. 426/262 |
| 4,551,340 | 11/1985 | El-Hag ..................................... 426/438 |
| 4,595,597 | 6/1986 | Lenchin et al. .......................... 426/555 |
| 4,632,848 | 12/1986 | Gosset et al. ............................ 427/154 |
| 4,663,180 | 5/1987 | Podula ..................................... 426/637 |
| 4,931,296 | 6/1990 | Shanbhag et al. ....................... 426/243 |
| 4,931,298 | 6/1990 | Shanbhag et al. ....................... 426/296 |
| 4,937,084 | 6/1990 | Julian ....................................... 426/144 |
| 5,000,970 | 3/1991 | Shanbhag et al. ....................... 426/296 |
| 5,004,616 | 4/1991 | Shanbhag et al. ....................... 426/102 |
| 5,059,435 | 10/1991 | Sloan et al. .............................. 426/102 |
| 5,084,291 | 1/1992 | Burrows et al. ......................... 426/441 |
| 5,087,467 | 2/1992 | Schwank .................................. 426/262 |
| 5,126,152 | 6/1992 | Feeney et al. ............................ 426/102 |
| 5,141,759 | 8/1992 | Sloan et al. ............................... 46/102 |
| 5,188,859 | 2/1993 | Lodge et al. ......................... 426/637 X |
| 5,217,736 | 6/1993 | Feeney et al. ............................ 426/102 |
| 5,242,699 | 9/1993 | Bednar et al. ........................... 426/302 |
| 5,279,840 | 1/1994 | Baisier et al. ............................ 426/102 |
| 5,281,432 | 1/1994 | Zallie et al. .............................. 426/549 |
| 5,302,410 | 4/1994 | Calder et al. ............................ 426/637 |
| 5,328,704 | 7/1994 | Ritch ........................................ 426/102 |
| 5,393,552 | 2/1995 | Brusacker et al. ....................... 426/637 |
| 5,431,944 | 7/1995 | Melvej ..................................... 426/552 |
| 5,464,642 | 11/1995 | Villagran et al. ........................ 426/439 |
| 5,486,369 | 1/1996 | Mason ...................................... 426/321 |
| 5,622,741 | 4/1997 | Stubbs et al. ............................ 426/243 |
| 5,648,110 | 7/1997 | Wu et al. .................................. 426/102 |

FOREIGN PATENT DOCUMENTS

WO 85/01188  3/1985  WIPO .

*Primary Examiner*—Arthur L. Corbin
*Attorney, Agent, or Firm*—Marshall, O'Toole, Gerstein, Murray & Borun

[57] ABSTRACT

The present invention provides improved compositions for coating of potato strip products having an as is solids content comprising at least 40% by weight of a hydrolyzed starch characterized by a DE of from 0.2 to 0.8.

8 Claims, No Drawings

PROCESS FOR PREPARING STARCH HYDROLYZATE COATED POTATO PRODUCTS

BACKGROUND OF THE INVENTION

The present invention relates generally to coated potato products and formulations for coating potato products such as frozen french fries.

Methods for preparing and applying coatings to the outer surfaces of frozen potato products are well known in the art. Murray et al. U.S. Pat. No. 3,597,227 disclose a process in which raw potato strips are coated in a hot aqueous solution of modified gelatinized amylose derived from corn or potato starch. The process is said to produce a finished product which has superior strength and rigidity. Van Patten et al., U.S. Pat. No. 3,751,268 disclose the coating of blanched potato pieces with an ungelatinized unmodified high amylose starch having an amylose content of at least 50 percent. The coated potato strips are deep fat fried during which the starch in the coating is gelatinized.

El-Hag et al. U.S. Pat. No. 4,317,842 discloses the process of dipping blanched potato strips in an aqueous ungelatinized starch slurry to coat the strips, which are next soaked in hot oil to gelatinize the starch in the coating. The strips are then parfried and frozen. The strips may be reheated for consumption by heating in an oven rather than by deep fat frying.

Lenchin et al., WO 85/01188 disclose batters comprising the flour of high amylose corn hybrids for producing microwaveable pre-fried foodstuffs. The use of flours of high amylose corn hybrids is said to provide pre-fried foodstuffs with improved crispness after microwave cooking which otherwise tends to make such products soggy.

Sloan et al., U.S. Pat. Nos. 5,059,435 and 5,141,759 disclose a process for preparing frozen coated potatoes wherein raw potatoes are washed, cut, blanched and partially dehydrated. The cut potatoes are then coated with an aqueous starch slurry comprising 15 to 35% by weight modified ungelatinized potato starch, 2 to 10% by weight modified ungelatinized corn starch, 2 to 10% by weight rice flour and other optional ingredients. The coated potato strips are parfried in oil and then frozen. The frozen strips are prepared for consumption by either finish frying in hot oil, or heating in an oven. The starch coating is said to enhance the holding quality of the ready to consume product and to improve the acceptability of the finished product by increasing the crispness of the outer surface, and helping to maintain the tenderness of the interior of the cut potato. In particular, the potato starch and corn starch are each said to contribute crispness to the coating, and because they are not gelatinized prior to the parfrying step they decrease clumping of the strips during processing. The rice flour is said to provide a desirable tenderness in the finished product.

The Sloan patents teach the use of potato starches which have been modified through known chemical cross-linking processes in order to minimize sticking or clumping of the strips during processing, and coat the potato strips evenly. The Sloan patents disclose as preferred an ungelatinized chemically modified potato starch (K-1010, Penford Corporation, Richland, Wash.) which is crosslinked with phosphorus oxychloride ($POCl_3$) at an effective level of 980 ppm. (This starch is characterized by a Brabender Amylograph viscosity of 50–100 BU ("Brabender units") when measured at a 9% starch solids concentration for 15 minutes at 95° C.) A chemically modified ungelatinized cornstarch said to be preferred for use in conjunction with the above modified potato starch at a slurry concentration of 2 to 10% by weight is said to be Flojel® 60 (National Starch and Chemical Corp., Bridgewater, N.J.) which is said to contribute crispness to the coating and to produce an optimal result when present in the coating slurry at a concentration of between two and ten percent by weight.

Also of interest to the present application are the disclosures of Calder et al., U.S. Pat. No. 5,302,410 and Brusacker et al., U.S. Pat. No. 5,393,552 which relate to the use of hydrolyzed starch products such as dextrins and maltodextrins as components of aqueous enrobing slurries. Specifically, the patents disclose contacting blanched potato strips with an aqueous solution which contains from 3% to 12% by weight of a hydrolyzed starch product characterized by a DE less than 12 and preferably from about 2 to 10. The patents specifically disclose the use of maltodextrins having a DE of 6 and teach against the use of maltodextrins having DE values greater than 12 because such hydrolyzate products promote undesirable browning of the final product. The patents further teach that concentrations of the starch hydrolyzate products greater than 12% are undesirable because "at higher concentrations the surface of the potato strips become slightly tacky upon finish frying which promotes undesirable clumping of the potato strips."

Of further interest to the present invention is the disclosure of Melvej, U.S. Pat. No. 5,431,944 which discloses a dry batter mix for french fries comprising from about 1.5% to about 9% by weight of a leavening agent and from about 5% to about 40% by weight of a starch blend comprising a high amylose starch, a starch, from about 1% to about 8% by weight dextrin wherein the weight percent in the batter mix is inversely related to the weight percent of the leavening agent, and about 0.1% to about 2% of a food gum. The specification teaches that the batter mix preferably includes about 2% to about 6%, by weight of dextrin and that the dextrin "provides a tender bite and in improved mouthfeel to the reconstituted food product." The patent further teaches that "[t]he particular amount of dextrin included in the batter mix is inversely related to the amount of leavening agent present in the batter mix. Therefore, as the amount of leavening agent in the batter is increased, the amount of dextrin in the batter mix is decreased, and vice versa. The dextrin mitigates the effects of the leavening agent and provides a more tender crispness. However, if too much dextrin is included in the batter mix, the reconstituted food product has a greasy mouthfeel." (Col. 7, lines 18–30).

Despite the many advances in the french fry coating art there nevertheless remains a need for improved enrobing slurries characterized by improved crispness, holding and flavor properties.

SUMMARY OF THE INVENTION

The present invention provides improved aqueous starch enrobing slurries which provide improved flavor, crispness and other physical properties to coated potato products such as french fries. As one aspect of the present invention, starch enrobing slurries have been found that provide various improved properties to the resulting french fries which they are used to encoat. Specifically it has been found that unexpected crispness can be obtained in a french fry coating composition by utilizing at least 40% by weight (on an as is solids basis) of a hydrolyzed starch characterized by a DE of from 0.2 to 0.8. This is particularly surprising in light of the teachings of Calder et al., U.S. Pat. No. 5,302,410 and Brusacker et al., U.S. Pat. No. 5,393,552 which teach that higher concentrations of starch hydrolyzate products such as maltodextrins and dextrins will render the surface of the potato strips slightly tacky upon finish frying and promote undesirable clumping of the potato strips. Similarly, Melvej, U.S. Patent No. 5,431,944 teaches that if too much dextrin is included in the batter mix, the reconstituted food product will have a greasy mouthfeel.

Without being bound to a particular theory of the invention, it is believed that elevated levels of starch hydrolyzate products may be successfully used according to the invention to provide improved crispness, texture and mouthfeel properties by virtue of the particular selection of chain length (molecular weight) of the hydrolyzate products. It has been found that starch hydrolyzate products characterized by a DE between about 0.2 and about 0.8 are characterized by a chain length for a given starch type which makes them particularly suitable for coating the potato strips and providing a crisp product with prolonged holding time and desirable organoleptic properties. It has further been found that hydrolyzate products characterized by DE's less than 0.2 which thus have longer chain lengths than the products of the invention and hydrolyzate products characterized by DE's greater than 0.8 which thus have shorter chain lengths than the products of the invention do not provide such desirable properties when they are present at elevated concentrations such as at 40% solids or higher. It is further contemplated that the improved properties provided by the solids making up the starch enrobing slurries of the invention may also be provided when the solids ingredients making up the slurries are applied to potato products in a non-slurry form such as by dusting.

Specifically, the invention provides improved aqueous starch enrobing slurries for coating the outer surface of a potato product having an as is solids content of at least 40% and preferably at least 50% by weight of a hydrolyzed starch characterized by a DE of from 0.2 to 0.8. "As is solids content" refers to the amount of solids present in typical commercially available potato starch which is not bone dry but typically comprises 12% to 16% water by weight. For the purposes of this invention "as is solids content" refers to a solids content for a starch assuming a water concentration of 14% by weight.

The hydrolyzed starch component of the starch enrobing slurry is preferably characterized by a DE of from about 0.2 to about 0.8. The hydrolyzed starch may be selected from the group including but not limited to hydrolyzed corn, waxy corn, potato, wheat, and tapioca starches with corn and potato starch hydrolyzate products being particularly preferred although hydrolyzed tapioca starches having a DE of 0.19 have been found to be particularly suitable for use according to the invention.

The invention further provides frozen potato products with a film-like coating on the outer surface and processes for their preparation, which processes comprise the steps of: cutting the raw potatoes; blanching the potatoes; partially drying the potatoes; coating the potatoes with an aqueous starch slurry, the starch slurry having an as is solids content comprising at least 40% by weight of a hydrolyzed starch characterized by a DE of from 0.2 to 0.8; parfrying the potatoes in hot oil; and freezing the potatoes.

The invention further provides a process for preparing an aqueous starch enrobing slurry for coating the outer surface of a potato product, which comprises forming an aqueous slurry having an as is solids content comprising at least 40% by weight of a hydrolyzed starch characterized by a DE of from 0.2 to 0.8. All ingredients stated herein are based on dry ingredients as 100%, with 100% to 400%, preferably 120% to 300% water added based upon dry ingredients to make the batter slurry.

DETAILED DESCRIPTION

Processes for the production of frozen french fries are well known and include the basic steps of preparing raw potatoes by washing, peeling and cutting into appropriately shaped pieces. The resulting potato strips are then blanched according to conventional methods in order to inactivate enzymes in the potato and to leach sugars from the surface of the potato strip. According to one preferred method, the blanched potato strips are treated in a brine solution comprising components such as sodium chloride, dextrose and other ingredients known to the art. After these steps, the potato strips are then subjected to a drying step to reduce the moisture present in the strips.

The strips are then coated with the aqueous starch enrobing slurry of the invention having an as is solids content comprising at least 40% by weight of a hydrolyzed starch characterized by a DE of from 0.2 to 0.8. After blending of the solid ingredients with a desired amount of water to produce the french fry batter, the batter may be applied to coat the cut potato strips at a batter pickup of from about 8% to about 30% with a pickup of from 13% to about 18% being preferred and a coating pickup of about 15% being particularly preferred, (based on coated potato strips weight).

After coating with the coating composition, the potato strips are drained and parfried at a temperature of from about 360° F. to about 390° F. for a time period of from 40 seconds to about 90 seconds. Parfrying serves to gelatinize the starch of the potato strips and of the coating and removes moisture from the inside of the potato strip.

The potato strips are then frozen, packaged and preferably stored at a temperature below 0° F. until they are prepared for final consumption. In order to prepare the potato strips for consumption, they are cooked either by finish frying or by baking in an oven. After such preparation, potato strips prepared according to the invention are characterized by a crisp outer layer, a moist tender interior and improved flavor qualities compared to those prepared with coating compositions comprising corn starch components.

Minor amounts of pregelled potato starches are preferably used in the compositions of the invention to provide viscosity control and suspension of the solids in the batter.

Specifically, the aqueous slurry may have an as is solids content of up to about 5% by weight of an unmodified pregelled potato starch for viscosity control. One preferred pregelled potato starch for such use is available commercially as PenPlus® 40 (Penwest Foods Co., Englewood, Colo.) which is preferably incorporated into the batter composition at a solids concentration of 1% to 5% by weight.

The starch enrobing slurry of the invention may also comprise a rice flour component which is preferably present at a solids concentration of from about 10% to about 25% by weight with concentrations of from about 15% to about 20% by weight (as is solids basis) being preferred. Greater concentrations of rice flour tend to make the final coated french fry products too tough while lower concentrations provide products with too little crispness. Rice flours suitable for use with the invention include long grain, medium grain or waxy rice with long grain rice flour being preferred. Long grain rice provides the best results for crispness, because of its higher amylose content in the starch. Use of medium grain rice flour tends to give a tough bite to the batter coating and waxy rice flour provides a hard crunch immediately after frying but the batter coating becomes soft and chewy within ten minutes after frying.

A variety of other flours and starches may optionally be used in producing the coating formulations of the invention including but not limited to potato flour, wheat flour, wheat starch, oat flour, oat starch, tapioca starch, corn flour and corn starch. Such starches may be crosslinked and/or substituted such as by acetylation or other means.

Optional ingredients for use in providing the coating compositions of the invention include microcrystalline cellulose, hydroxypropyl methyl cellulose and gums which are used to provide improved structure and keeping qualities to the coated french fry products. Suitable gums include guar and xanthan gums.

Leavening agents in the form of baking powders may also be incorporated into the compositions of the invention in order to open up the structure of the coating batters upon cooking and release moisture from the french fry products without blowing off the coating layer. Suitable baking powders include sodium bicarbonate plus one or more leavening acids such as those in the group consisting of sodium aluminum phosphate (SALP), sodium aluminum sulfate (SAS), sodium acid pyrophosphate (SAPP), dicalcium phosphate (DCP), and anhydrous monocalcium phosphate (AMCP). The combination of sodium bicarbonate and SALP is preferred because of its bland flavor and slower action. SAPP and DCP give off-flavor in the coating and AMCP reacts too fast during mixing of the batter. Such leavening agents are preferably added at sodium bicarbonate concentrations of about 0.2 to 2.0%.

Additional ingredients include protein components such as sodium caseinate, nonfat dry milk, soy, whey, dried egg whites. Such proteins interact with the carbohydrates in the coating compositions to increase film strength, provide structure, improve crispness and prolong holding of crispness. Milk proteins perform better than egg whites or soy proteins in performing such functions. Other ingredients include carbohydrate components such as methyl cellulose, hydroxypropyl methyl cellulose, microcrystalline cellulose and the like. Still other optional ingredients may also be incorporated into the coating formulations of the invention including salt, flavorings, seasonings and coloring agents such as whey or dextrose. A particularly preferred dextrose product is available commercially as Cantab® (Penwest Foods Co., Englewood, Colo.).

The french fry coating composition is prepared by dry blending of the various solid ingredients. The dry ingredients are then slowly added to an amount of water selected to provide an appropriate viscosity to the coating batter. It has been found that aqueous slurries containing from about 150 parts to about 300 parts by weight water to 100 parts by weight of the solid ingredients are characterized by a preferred viscosity for coating of the potato strips. The enrobing batter is then preferably applied to potato strips at a batter pickup of 13% to 18% by weight. Because the starches remain ungelatinized during the coating process they do not substantially contribute to the viscosity of the solution.

The crispness of the batter coated french fries is determined by several factors including the cook-out of the starch, the moisture balance between the batter coating surface and inside of the fries, the thickness of the coating layer, and the interaction of ingredients in the coating formulation. The coating forms a dry, discontinuous film, which lets the moisture from the inside of the fries escape or vent out, but will not absorb the moisture into the coating layer. Controlling moisture migration is important to maintaining the crispness of the fries under a heat lamp. The coating should preferably be somewhat brittle, which gives a clean bite with minimum toughness. There is a fine balance between all the ingredients in the batter formula to achieve crispness and keeping quality with the method used to process the potato strips contributing to the crispness of the french fries.

Other aspects and advantages of the present invention will be understood upon consideration of the following illustrative and comparative examples.

EXAMPLE 1

According to this example, potato strips were prepared according to conventional methods and coated with various starch slurries comprising starch hydrolyzate products (maltodextrins) characterized by different DEs using the ingredients listed in Table 1 below.

Specifically, Russet-Burbank potatoes were peeled, cut into 9/32 inch strips and immersed and blanched in hot water for 4 to 8 minutes at 170–180° F. After blanching, the potato strips were immersed for 30 seconds in an aqueous solution comprising 0.5% SAPP which was held at a temperature of 160–170° F. After removal, the strips were drained and then dried in a conventional dryer at 190° F., for a sufficient length of time to effectuate a 12 to 20 percent water loss.

Starch slurries were then prepared comprising the ingredients listed in Table 1 including water at about 50° F. The water and dry ingredients were placed in a mixing bowl and mixed with a paddle for three minutes at low speed and one minute at medium speed with the batter temperature maintained at below 65° F. The potato strips were then dipped in the starch slurries and held at 65° F. The potato strips were then drained for 60 seconds to remove excess slurry and to achieve a slurry coating pickup of 15%. The strips were then parfried in soy oil for 50 seconds at 385° F. The potato strips were then frozen in a blast freezer for 30 minutes, transferred into plastic bags and kept in the same freezer overnight at approximately 0° F. The frozen samples were reconstituted by frying at 360° F for 2.5 minutes. The resulting french fries were then placed under heat 5 lamps, and evaluated for color, bite, crispness, taste and holding time.

The resulting products were then tested to evaluate their properties including the degree of crispness (1 being the poorest and 6 being the best), and the time period for which they maintained their crispness with the results presented in Table 1. The results of evaluation of those batters show that the starch enrobing slurries produced from potato starch hydrolyzates characterized by DE values greater than 0.8 were characterized by poor crispness, short holding times, fries sticking together and other poor organoleptic properties. In contrast, those batters comprising starch hydrolyzate products characterized by having DEs between 0.2 and 0.8 provided improved crispness, longer heat lamp holding times of 15 or 20 minutes and superior organoleptic properties in the absence of corn starch. In particular, those batters comprising potato starch hydrolyzates with a DE of 0.76 provided significantly improved properties to the french fries to which they were applied compared with those coated with batters having higher DE levels.

TABLE 1

POTATO STARCH HYDROLYZATES (DE 0–6)

| INGREDIENTS | DE | Percent by weight of total solids: | | | |
|---|---|---|---|---|---|
| Hydrolyzed Potato Starch (Staley, StaSlim-143) | 0.34 | 57.59 | | | |
| Hydrolyzed Potato Starch | 0.76 | | 57.59 | | |
| Hydrolyzed Potato Starch | 1.87 | | | 57.59 | |
| Hydrolyzed Potato Starch (Avebe MD-6) | 4.59 | | | | 57.59 |
| Crosslinked Potato Starch (900 ppm) | | 12.75 | 12.75 | 12.75 | 12.75 |
| Pregelled crosslinked (213 ppm) Potato Starch (Penwest, PenPlus-40) | | 1.52 | 1.52 | 1.52 | 1.52 |
| Guar Gum Blend | | 0.11 | 0.11 | 0.11 | 0.11 |
| SAPP#28 | | 1.17 | 1.17 | 1.17 | 1.17 |
| Soda | | 0.96 | 0.96 | 0.96 | 0.96 |
| Salt | | 4.79 | 4.79 | 4.79 | 4.79 |
| Rice Flour | | 21.11 | 21.11 | 21.11 | 21.11 |
| Total | | 100 | 100 | 100 | 1.00 |
| Crispness at 15 Minutes | | 5 | 5.5 | 4 | 3 |

EXAMPLE 2

According to this example, potato strips were prepared and evaluated according to the method of example 1 but wherein corn starch hydrolyzates characterized by a range of DE values were used in the enrobing slurry. The results reported in Table 2 are consistent with those of example 1 in that the best product was that produced with a corn maltodextrin characterized by a DE value of 0.33. Those products produced with comparable batters which differed only with respect to the DE of the corn starch hydrolyzate all had inferior properties compared to those of the invention. Thus, the product comprising a corn hydrolyzate with a DE of 0.08 had unsatisfactory crispness results while those products comprising corn hydrolyzates of DE 1 and higher had unsatisfactory to very poor results.

TABLE 2

CORN STARCH HYDROLYZATES (DE 0–6) RANGE USING CORN STARCH

| INGREDIENTS | DE | Percent by weight of total solids: | | |
|---|---|---|---|---|
| Hydrolyzed Corn Starch | 0.08 | 56.19 | | |
| Hydrolyzed Corn Starch | 0.33 | | 56.19 | |
| Hydrolyzed Corn Starch (Staley, Star Dri #1) | 1 | | | 56.19 |

TABLE 2-continued

CORN STARCH HYDROLYZATES (DE 0–6) RANGE USING CORN STARCH

| INGREDIENTS | DE | Percent by weight of total solids: | | | | |
|---|---|---|---|---|---|---|
| Hydrolyzed Corn Starch (Grain Processing M-040) | 6.27 | | | | | 56.19 |
| Hydrolyzed Corn Starch (Staley, Star Dri #10) | 9.0–10.0 | | | | | 56.19 |
| Crosslinked Potato Starch (900 ppm) | | 12.75 | 12.75 | 12.75 | 12.75 | 12.75 |
| Pregelled crosslinked (213 ppm) Potato Starch (Penwest, PenPlus-40) | | 2.92 | 2.92 | 2.92 | 2.92 | 2.92 |
| Guar Gum Blend | | 0.22 | 0.22 | 0.22 | 0.22 | 0.22 |
| SAPP#28 | | 1.17 | 1.17 | 1.17 | 1.17 | 1.17 |
| Soda | | 0.96 | 0.96 | 0.96 | 0.96 | 0.96 |
| Salt | | 4.79 | 4.79 | 4.79 | 4.79 | 4.79 |
| Rice Flour | | 21 | 21 | 21 | 21 | 21 |
| Total | | 100 | 100 | 100 | 100 | 100 |
| Crispness at 15 Minutes | | 4 | 5 | 3.5 | 3.5 | 1.5 |

EXAMPLE 3

According to this example, potato strips were prepared and evaluated according to the method of example 1 using a preferred hydrolyzed corn product (Sta-Slim 143) characterized by a DE of 0.34 wherein the percent of total solids provided by the corn starch hydrolyzate was varied. The results shown in Table 3 show that good properties tend to occur at starch hydrolyzate solids concentrations of 40% by weight and greater with particularly superior properties occurring at solids concentrations of 60% by weight and greater.

TABLE 3

CONCENTRATION TESTING OF HYDROLYZED POTATO STARCH (DE 0.34)

| INGREDIENT | Percent by weight of total solids | | | | |
|---|---|---|---|---|---|
| Hydrolyzed Potato Starch (Staley, Sta-slim 143 (DE 0.34)) | 30 | 40 | 50 | 60 | 70 |
| Crosslinked Potato Starch 800 ppm | 40 | 30 | 20 | 10 | 0 |
| Pregelled crosslinked (213 ppm) Potato Starch (Penwest, PenPlus-40) | 1.7 | 1.7 | 1.7 | 1.7 | 1.7 |
| Maltodextrin DE = 4 | 2.4 | 2.4 | 2.4 | 2.4 | 2.4 |
| SAPP#28 | 1.6 | 1.6 | 1.6 | 1.6 | 1.6 |
| Soda | 1.3 | 1.3 | 1.3 | 1.3 | 1.3 |
| Salt | 4 | 4 | 4 | 4 | 4 |
| Rice Flour | 19 | 19 | 19 | 19 | 19 |
| Total | 100 | 100 | 100 | 100 | 100 |
| Crispness at 15 Minutes | 4 | 4.5 | 4.5 | 5 | 5.5 |

EXAMPLE 4

According to this example, potato strips were prepared and evaluated according to the method of example 1 using a preferred hydrolyzed corn product (Sta-Slim 143) characterized by a DE of 0.34 wherein the batter solids concentration was varied from 30% by weight to 42% by weight. The results shown in Table 4 show that optimum product properties tend to occur at batter solids concentrations of 39% to 42%

TABLE 4

BATTER SOLIDS TESTING OF HYDROLYZED POTATO STARCH (DE = 0.34)

| | Percent by weight of total solids | | | | |
|---|---|---|---|---|---|
| Hydrolyzed Potato Starch (Staley, Sta-Slim 143 (DE 0.34)) | 54.01 | 55.6 | 56.6 | 57.36 | 57.88 |
| Crosslinked Potato Starch 800 ppm | 12.45 | 12.82 | 13.04 | 13.22 | 13.34 |
| Guar Gum | 0.02 | 0.02 | 0.02 | 0.02 | 0.02 |
| SAPP#28 | 1.12 | 1.15 | 1.17 | 1.19 | 1.2 |
| Soda | 0.92 | 0.95 | 0.97 | 0.98 | 0.99 |
| Salt | 4.61 | 4.74 | 4.83 | 4.89 | 4.94 |
| Rice Flour | 20.2 | 20.78 | 21.15 | 21.44 | 21.63 |
| Pregelled crosslinked (213 ppm) Potato Starch (Penwest, PenPlus-40) | 6.67 | 3.94 | 2.22 | 0.9 | 0 |
| Total | 100 | 100 | 100 | 100 | 100 |
| Batter Solids | 30% | 33% | 36% | 39% | 42% |
| Crispness at 15 Minutes | 4 | 4 | 4.5 | 5 | 5 |

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. A process for preparing a frozen potato product with a film-like coating on the outer surface, which comprises:

cutting raw potatoes;

blanching the raw potatoes;

partially drying the blanched potatoes;

coating the partially dried potatoes with an aqueous starch slurry having an as is solids content comprising at least 40% by weight of a hydrolyzed starch characterized by a DE of from 0.2 to 0.8;

parfrying the coated potatoes in hot oil; and freezing parfried the potatoes.

2. The process of claim 1 wherein the aqueous starch slurry is characterized by an as is solids content of at least 50% by weight of said hydrolyzed starch.

3. The process of claim 1 wherein said hydrolyzed starch is characterized by a DE of from 0.3 to 0.5.

4. The process of claim 1 wherein the hydrolyzed starch is selected from the group consisting of corn and potato starches.

5. The process of claim 1 wherein the aqueous starch slurry further comprises a crosslinked starch.

6. The process of claim 1 wherein rice flour is present in the aqueous starch slurry at from 15% to 20% by weight.

7. A coated potato product produced according to the method of claim 1.

8. A fried potato product having a coating comprising an as is solids content of at least 40% by weight of a hydrolyzed starch characterized by a DE of from 0.2 to 0.8.

* * * * *